(12) United States Patent
Pendse

(10) Patent No.: US 8,918,863 B1
(45) Date of Patent: Dec. 23, 2014

(54) METHOD AND APPARATUS FOR MONITORING SOURCE DATA THAT IS A TARGET OF A BACKUP SERVICE TO DETECT MALICIOUS ATTACKS AND HUMAN ERRORS

(75) Inventor: Bhargav Pendse, Lake Mary, FL (US)

(73) Assignee: Symantec Corporation, Mountain View, CA (US)

( * ) Notice: Subject to any disclaimer, the term of this patent is extended or adjusted under 35 U.S.C. 154(b) by 1633 days.

(21) Appl. No.: 11/643,256

(22) Filed: Dec. 21, 2006

(51) Int. Cl.
*H04L 29/06* (2006.01)

(52) U.S. Cl.
USPC .......................................... 726/22; 707/640

(58) Field of Classification Search
USPC ..................... 726/22; 707/999.1, 999, 640
See application file for complete search history.

(56) References Cited

U.S. PATENT DOCUMENTS

| 6,205,527 B1 * | 3/2001 | Goshey et al. ................. 711/162 |
| 2004/0107199 A1 * | 6/2004 | Dalrymple et al. ........... 707/100 |

* cited by examiner

*Primary Examiner* — Brandon Hoffman
*Assistant Examiner* — Thong Truong
(74) *Attorney, Agent, or Firm* — Wilmer Cutler Pickering Hale and Dorr LLP

(57) ABSTRACT

Method and apparatus for monitoring source data that is a target of a backup service is described. In one example, backup data produced by the backup service is analyzed to identify changes in the source data. At least one trend related to the changes is identified. At least one deviation in the changes from the at least one trend is identified. At least one notification may then be generated that includes information indicative of the at least one deviation. The notification(s) may be sent to a network management system as an indication of user error or malicious attacks.

16 Claims, 4 Drawing Sheets

METHOD AND APPARATUS FOR MONITORING SOURCE DATA THAT IS A TARGET OF A BACKUP SERVICE TO DETECT MALICIOUS ATTACKS AND HUMAN ERRORS

BACKGROUND OF THE INVENTION

1. Field of the Invention

Embodiments of the invention generally relate to data monitoring and trend deviation systems and processes and, more specifically, to a method and apparatus for monitoring source data that is a target of a backup service to detect malicious attacks and human errors.

2. Description of the Related Art

Computer systems and their components are subject to various failures that may result in the loss of data. For example, a storage device used in or by the computer system may experience a failure (e.g., mechanical, electrical, magnetic, etc.) that may make any data stored on the device unreadable. Erroneous software or hardware operation may corrupt the data stored on a storage device and effectively destroy the data stored on an otherwise properly functioning storage device.

To mitigate the risk of losing data, computer networks include backup systems for making backup copies of data stored on various storage devices. One type of backup system includes a dedicated backup server that backs up target data on one or more storage devices used in or by one or more computer systems, such as workstations and/or application servers. The backup server typically backs up the target data periodically according to a schedule. The data may be backed up initially to disk-based storage and then migrated to an archival storage, such as tape-based storage. The backup server may implement any of various known schemes to backup data, including full backups, incremental backups, differential backups, and the like. A full backup is a complete copy of the target data. An incremental backup is a backup that only contains the files that have changed since the most recent backup (either full or incremental). A differential backup is a cumulative backup of all changes made since the last full backup.

A backup service, however, will not protect against unauthorized changes to the target data due to user error, malicious activity (e.g., viruses), or the like. If the target data is deleteriously changed in this fashion, such changes are merely backed up to the backup server. Accordingly, there exists a need in the art for a method and apparatus for monitoring source data that is a target of a backup service in order to detect unauthorized file changes.

SUMMARY OF THE INVENTION

An aspect of the invention relates to a method and computer readable medium that monitors source data that is a target of a backup service. Backup data produced by the backup service is analyzed to identify changes in the source data. At least one trend related to the changes is identified. At least one deviation in the changes from the at least one trend is identified. At least one notification may then be generated that includes information indicative of the at least one deviation. The notification(s) may be sent to a network management system. In one embodiment, the backup service produces backup data over a plurality of backup cycles and the changes include sets of changes produced over the plurality of backup cycles. The sets of changes are compared to threshold data as each set of changes is produced and a trend or trends is/are defined for each set of changes that satisfies the threshold data. In addition, the sets of changes are compared against rule(s) that describe the trend(s) as each set of changes is produced and a deviation or deviations from the trend(s) is/are defined for each set of changes that violates at least one rule.

Another aspect of the invention relates to an apparatus for monitoring source data that is a target of a backup service. The apparatus includes a rule generation module and a detection module. The rule generation module is configured to configured to identify changes in the source data from backup data produced by the backup service and identify at least one trend related to the changes. The detection module is configured to identify the changes in the source data from the backup data and identify at least one deviation in the changes from the at least one trend.

Another aspect of the invention relates to a system including at least one computer, a backup server, and a monitoring module. The computer system(s) is/are configured to manage source data. The backup server is configured to provide a backup service the target of which is the source data. The backup service maintains backup data that defines a backup of the source data. The monitoring module includes a rule generation module and a detection module. The rule generation module is configured to identify changes in the source data from backup data produced by the backup service and identify at least one trend related to the changes. A detection module is configured to identify the changes in the source data from the backup data and identify at least one deviation in the changes from the at least one trend.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
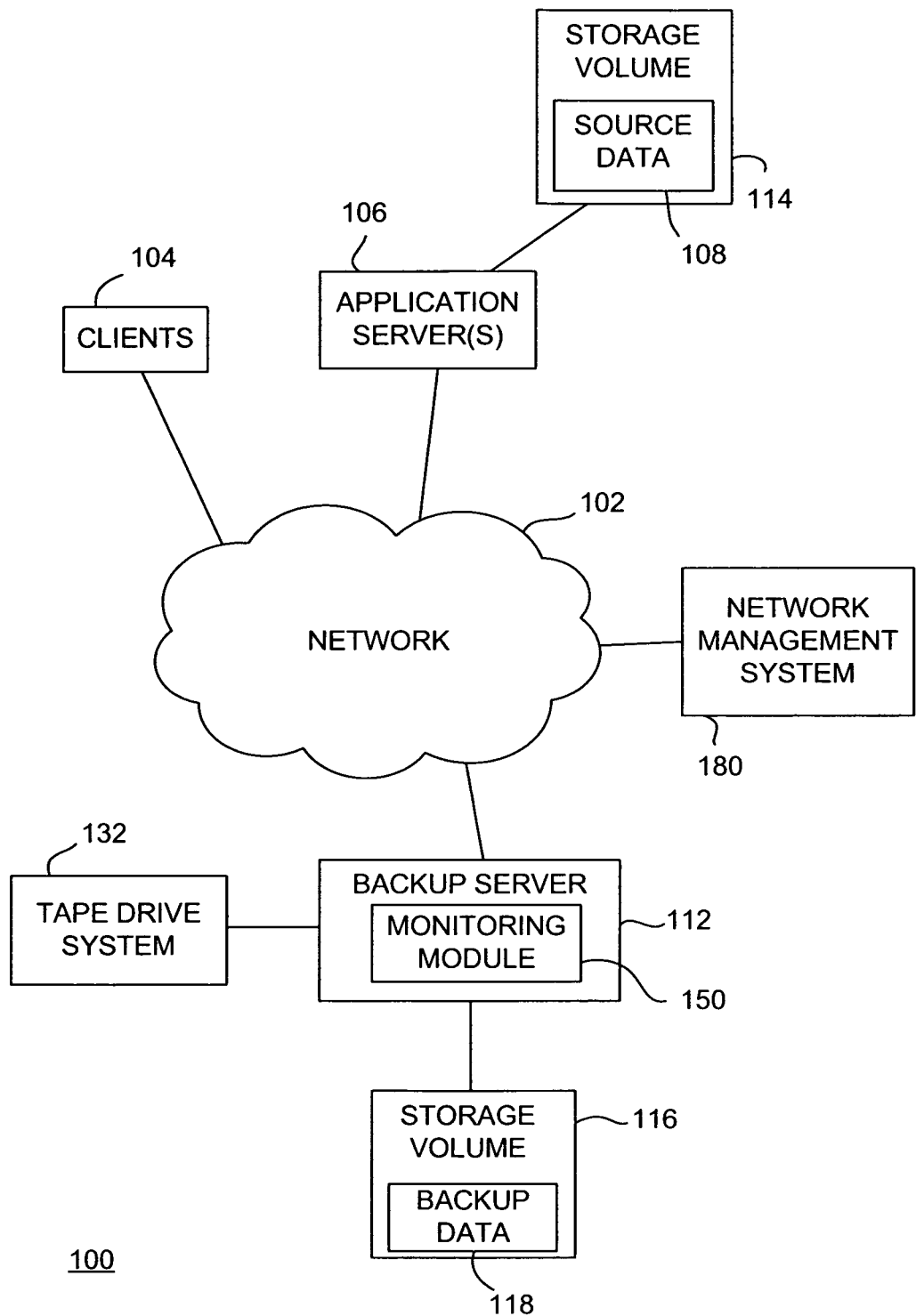
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102, clients 104, one or more application servers 106, and a backup server 112. The clients 104 are configured for communication with the application servers 106 via the network 102. The network 102 comprises a communication system that connects computer systems by wire, cable, fiber optic, and/or wireless links facilitated by various types of well-known network elements, such as hubs, switches, routers, and the like. The network 102 may employ various well-known protocols to communication information. The clients 104 may comprise various types of computers, such as laptops, desktop computers, workstations, and the like. The application servers 106 host services for the clients 104. For example, the application servers 106 may include file servers, e-mail servers, terminal servers, and/or the like. The application servers 106 may be implemented using any type of computer systems capable of hosting services for the clients 104.

The application servers 106 manage one or more storage volumes 114. The storage volumes 114 may be implemented using any type of storage system or storage systems, such as a disk drive system. A disk drive system may include, for example, one or more storage disks, e.g., an array of storage disks or redundant array of storage disks. A volume is a logical storage construct that does not necessarily correspond to any particular physical storage device. A physical storage device may include more than one volume, and a volume may span more than one storage device. The storage volumes 114 store source data 108, such as application programs and program data created and managed by the application servers 106. The source data is organized into a file system. A file system refers to the structure and arrangement of files in a storage device. For example, a file system typically includes a hierarchy of directories, each of which may contain one or more files.

The backup server 112 hosts a backup service for the application servers 106. The backup server 112 may be implemented using any type of computer system capable of hosting a backup service. The backup server 112 is configured to manage a storage volume 116. The storage volume 116 may be implemented using the same storage system that implements the storage volume 114, or using a separate storage system (e.g., a separate disk drive system). The backup server 112 is also coupled to a tape drive system 132. The tape drive system 132 may include one or more tape drives. The storage volume 116 stores backup data 118 that comprises a backup of the source data 108.

In particular, the backup server 112 is configured to back up the source data 108 at points in time in accordance with a defined schedule to produce the backup data 118. The backup server 112 may also be configured to back up the source data or portions thereof continuously. In general, the backup data 118 represents the state of the source data 108 at given points in time. The backup server 112 initially makes a full copy of the source data 108. Afterwards, the backup server 112 receives file change information from the application servers 106 and a backup of the file changes is produced. Such a backup process is known as incremental or differential backups, and is well known in the art. In this manner, the backup data 118 includes a history of changes to the source data 108 as a result of the backup process.

In accordance with one aspect of the invention, the backup server 112 includes a monitoring module 150. The monitoring module 150 is configured to monitor changes in the source data 108, create trend data in response to the changes, detect any deviation from this trend data, and notify system administrators about the deviation. The monitoring module 150 monitors changes in the source data 108 and detects deviations from the trend data using the backup data 118. Notifications of the deviations may be sent to a network management system 180 coupled to the network 102. Deviations from established trend data may indicate possible user errors or malicious attacks that would otherwise be difficult to detect.

Figure 2:
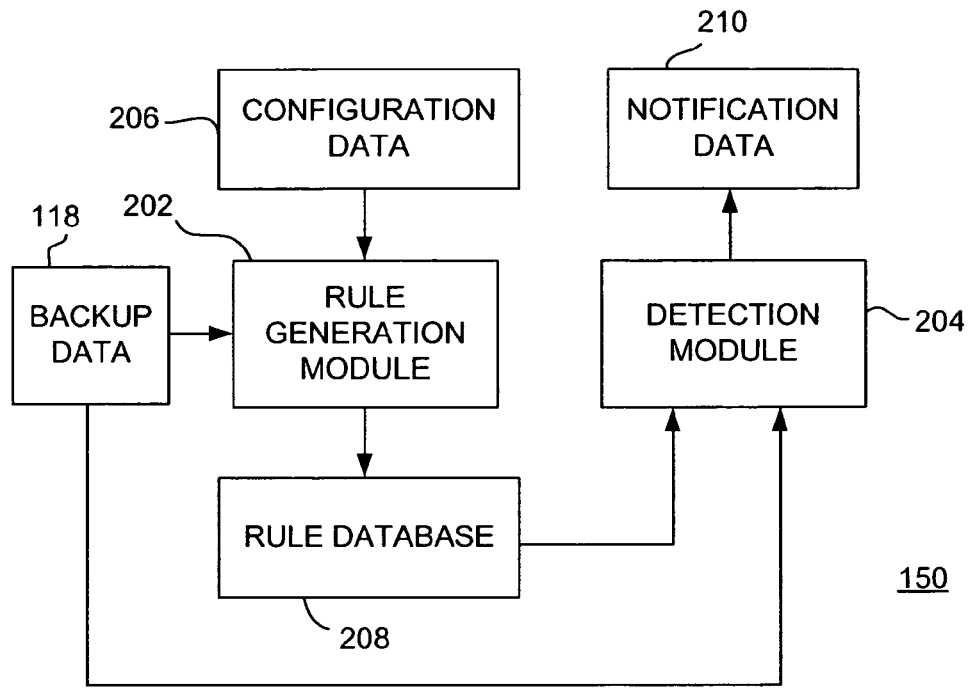
FIG. 2 is a block diagram depicting an exemplary embodiment of the monitoring module in accordance with one or more aspects of the invention.

FIG. 2 is a block diagram depicting an exemplary embodiment of the monitoring module 150 in accordance with one or more aspects of the invention. The monitoring module 150 includes a rule generation module 202 and a detection module 204. The rule generation module 202 is configured to receive configuration data 206. The rule generation module 202 is also configured to analyze the backup data 118 maintained by the backup server 112 over time. Through this analysis, the rule generation module 202 detects trends related to changes in the source data 108. Source data changes include deletion, creation, or modification of files. The configuration data 206 determines what types of changes and over what periods of times such changes occur before a trend is established. In essence, the configuration data 206 establishes thresholds for the establishment of trends. The configuration data 206 may be established by a system administrator. The rule generation module 202 may be configured with default configuration data. For each established trend, the rule generation module 202 generates a rule. Rules generated by the rule generation module 202 are stored in the rule database 208.

Some trends relate to changes in particular files or particular types of files over times. For example, the rule generation module 202 may detect a trend whereby some files in the source data 108 are deleted infrequently (e.g., core operating system files). The threshold frequency of deletion for particular files after a threshold period of time may be set via the configuration data 206. In another example, the rule generation module 202 may detect a trend whereby modifications in some files in the source data 108 occur infrequently (e.g., system registry files). The threshold frequency of modification for particular files after a threshold period of time may be set via the configuration data 206. In another example, the rule generation module 202 may detect a trend whereby some executable files are never modified (e.g., operating system executables, program executables, etc.). Other trends relate to changes in any file during particular periods of time. For example, the rule generation module 202 may detect a trend whereby files in general are changed on the weekend infrequently (based on a threshold). In yet another example, the rule generation module 202 may detect a trend whereby on an average day a threshold percentage of files are modified. Again, all the thresholds for both frequency of change and period of time are established by the configuration data 206. Moreover, all of these changes may be detected by analyzing the backup data 118. Those skilled in the art will appreciate that the rule generation module 202 may detect a myriad of trends in the source data 108 similar to those described above based on the configuration data 206 and the backup data 118.

The detection module 204 is configured to access the rule database 208 to obtain the generated rules. The detection module 204 is also configured to analyze the backup data 118 maintained by the backup server 112 over time. Through this analysis, the detection module 204 detects violations of the rules related to changes in the source data 108. Rule violations are deviations from the established trends described by the rules. In response to each rule violation, the detection module 204 generates a notification. The notification may include data indicative of the particular rule that was violated and the changes to the source data 108 that causes the rule violation. Notifications 210 produced by the detection module 204 may be sent to the network management system 180 in order to alert system administrators.

Figure 3:
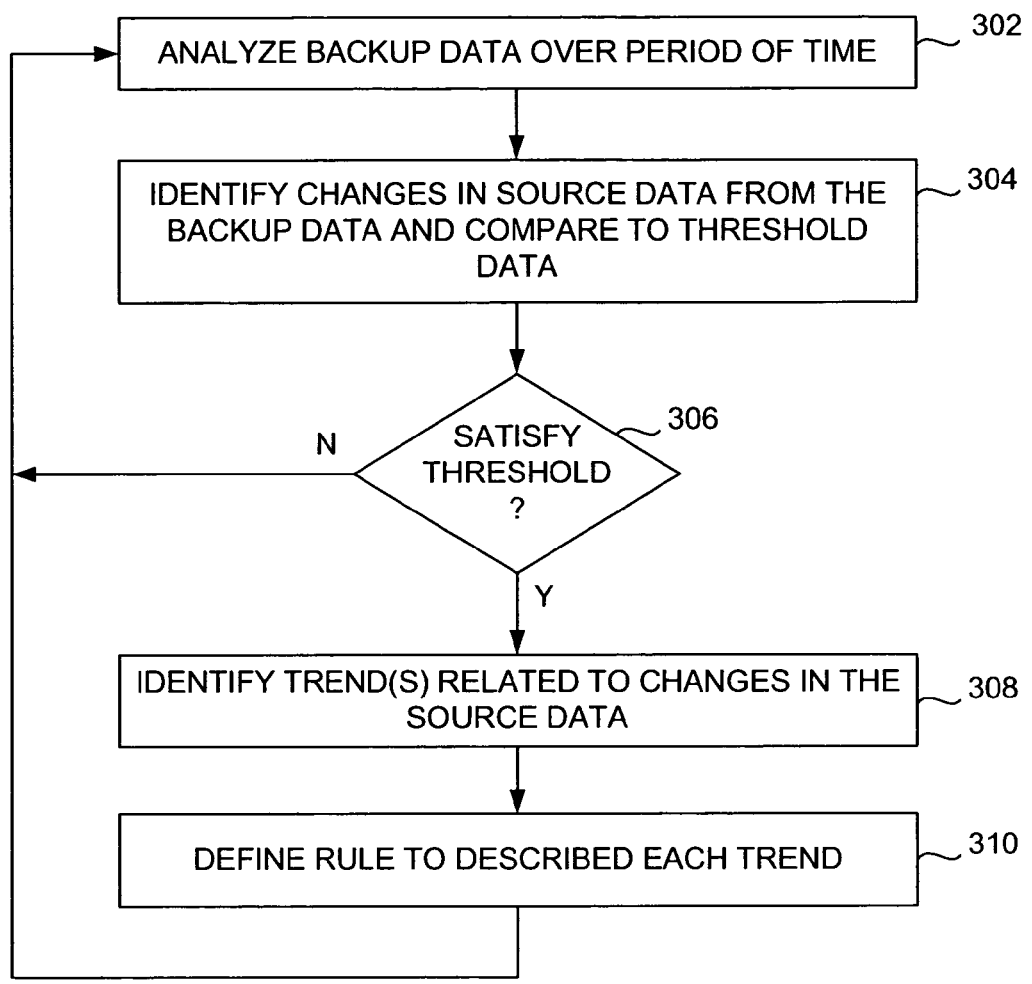
FIG. 3 is a flow diagram depicting an exemplary embodiment of a method for detecting trends in source data that is the target of a backup service in accordance with one or more aspects of the invention.

FIG. 3 is a flow diagram depicting an exemplary embodiment of a method 300 for detecting trends in source data that is the target of a backup service in accordance with one or more aspects of the invention. The method 300 begins at step 302, where backup data produced by the backup service is analyzed over a period of time. At step 304, changes in the source data identified from the backup data are compared to threshold data. At step 306, a determination is made whether the source data changes satisfy any of the thresholds. If not, the method 300 returns to step 302 and repeats. Otherwise, the method 300 proceeds to step 308, where one or more trends related to the changes in the source data are identified. At step 310, a rule is defined to describe each of the established trends. The method 300 returns to step 302 and repeats.

Figure 4:
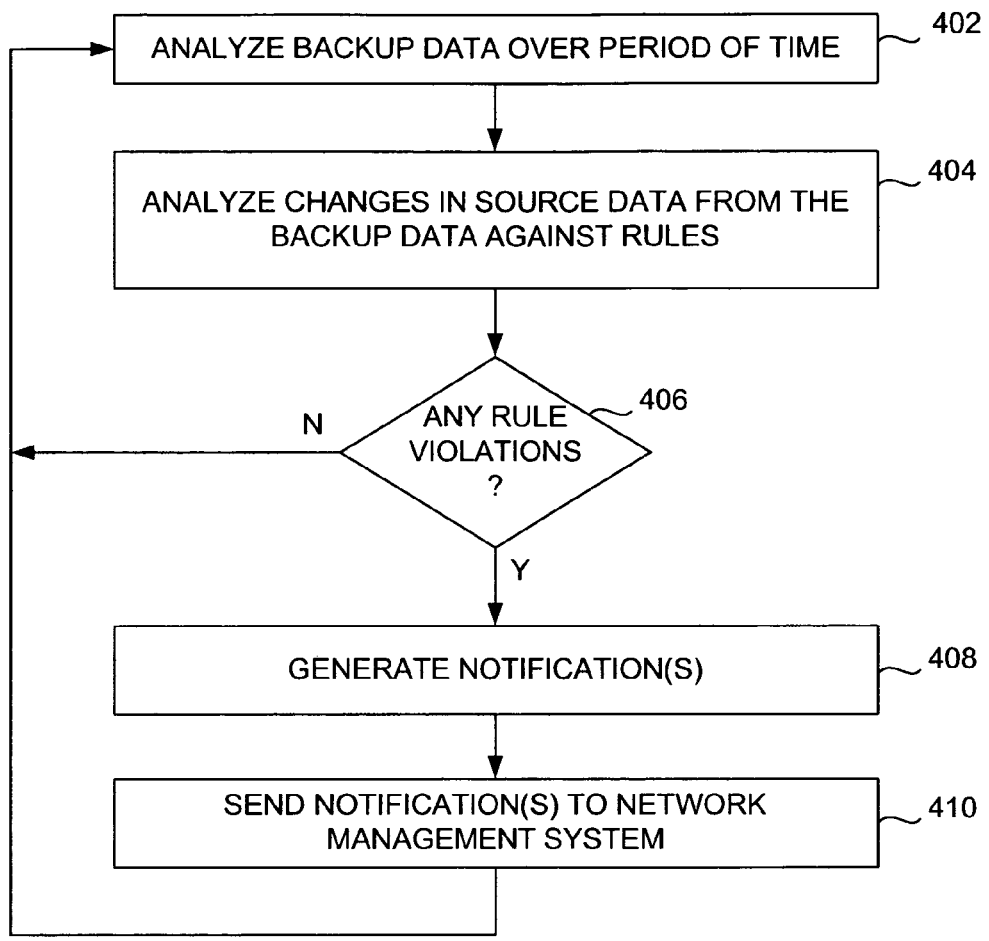
FIG. 4 is a flow diagram depicting an exemplary embodiment of a method for detecting deviations in changes of source data that is the target of a backup service from established trends in accordance with one or more aspects of the invention.

FIG. 4 is a flow diagram depicting an exemplary embodiment of a method 400 for detecting deviations in changes of source data that is the target of a backup service from established trends in accordance with one or more aspects of the invention. The method 400 begins at step 402, where backup data produced by the backup service is analyzed over a period of time. At step 404, changes in the source data identified from the backup data are analyzed against rules. The rules describe established trends in changes of the source data (e.g., identified by the process 300 of FIG. 3). At step 406, a determination is made whether any of the rules have been violated. If not, the method 400 returns to step 402 and repeats. Otherwise, the method 400 proceeds to step 408, where one or more notifications is/are generated. Each notification may include information indicative of the particular rule or rules that were violated, as well as the changes in the source data that caused the rule violations. At step 410, the notification(s) are sent to a network management system. The method 400 returns to step 402 and repeats.

Figure 5:
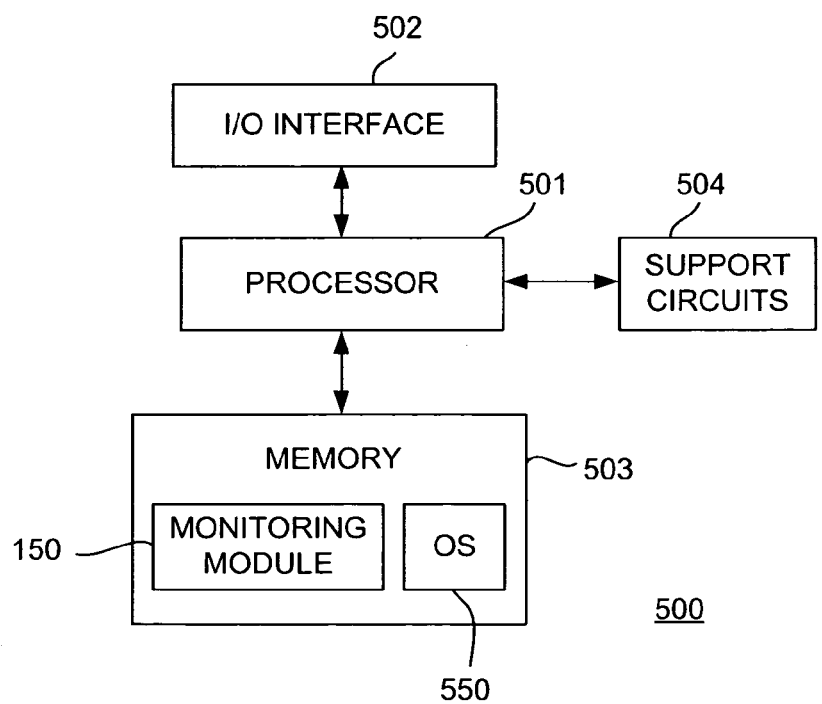
FIG. 5 is a block diagram depicting an exemplary embodiment of a computer system in accordance with one or more aspects of the invention.

FIG. 5 is a block diagram depicting an exemplary embodiment of a computer system 500 in accordance with one or more aspects of the invention. The computer system 500 may be used to implement the backup server 112. The computer system 500 includes a processor 501, a memory 503, various support circuits 504, and an I/O interface 502. The processor 501 may include one or more microprocessors known in the art. The support circuits 504 for the processor 501 include conventional cache, power supplies, clock circuits, data registers, I/O interfaces, and the like. The I/O interface 502 may be directly coupled to the memory 503 or coupled through the processor 501. The I/O interface 502 may also be configured for communication with a network, with various storage devices, as well as other types of input and output devices (e.g., mouse, keyboard, display, etc).

The memory 503 stores processor-executable instructions and/or data that may be executed by and/or used by the processor 501. These processor-executable instructions may comprise hardware, firmware, software, and the like, or some combination thereof. Modules having processor-executable instructions that are stored in the memory 503 may include the monitoring module 150. The computer system 500 may be programmed with an operating system 550, which may be OS/2, Java Virtual Machine, Linux, Solaris, Unix, Windows, Windows95, Windows98, Windows NT, and Windows2000, WindowsME, and WindowsXP, Windows Server, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like.

An aspect of the invention is implemented as a program product for use with a computer system. Program(s) of the program product defines functions of embodiments and can be contained on a variety of computer-readable media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method of monitoring source data that is a target of a backup service, comprising:
   receiving configuration data that identifies a type of change and a period of time over which the type of change is to occur before a trend is established, wherein the type of change comprises at least one of a deletion, creation, and modification of files;
   generating threshold data based on the type of change and the period of time;
   analyzing backup data produced by the backup service over the period of time;
   identifying a first plurality of changes in the source data using at least one computer;
   comparing the first plurality of changes to the threshold data;
   defining at least one trend in response to the first plurality of changes satisfying the threshold data, wherein defining the at least one trend comprises at least determining that a plurality of files are modified infrequently based on comparing the first plurality of changes to the threshold data;
   generating at least one rule that respectively describes the at least one trend, wherein the at least one rule is defined by the configuration data; and
   identifying at least one deviation from the at least one trend in a second plurality of changes in the source data.

2. The method of claim 1, wherein the backup service produces the backup data over a plurality of backup cycles and the first plurality of changes and the second plurality of changes are produced over the plurality of backup cycles.

3. The method of claim 1, wherein the step of identifying the at least one deviation comprises:
   comparing the second plurality of changes against the at least one rule as the second plurality of changes are produced; and
   defining a deviation or deviations from the at least one trend in response to the second plurality of changes violating the at least one rule.

4. The method of claim 1, further comprising:
   generating at least one notification including information indicative of the at least one deviation; and
   sending the at least one notification to a network management system.

5. The method of claim 1, wherein each of the at least one trend is defined by a frequency of change in at least one file or at least one file type over at least one period of time.

6. An apparatus for monitoring source data that is a target of a backup service, comprising:
   means for receiving configuration data that identifies a type of change and a period of time over which the type of change is to occur before a trend is established, wherein the type of change comprises at least one of a deletion, creation, and modification of files;
   means for generating threshold data based on the type of change and the period of time;
   means for analyzing backup data produced by the backup service over the period of time;
   means for identifying a first plurality of changes in the source;
   means for comparing the first plurality of changes to the threshold data;
   means for defining at least one trend in response to the first plurality of changes satisfying the threshold data, wherein defining the at least one trend comprises at least determining that a plurality of files are modified infrequently based on comparing the first plurality of changes to the threshold data;
   means for generating at least one rule that respectively describes the at least one trend, wherein the at least one rule is defined by the configuration data; and
   means for identifying at least one deviation from the at least one trend in a second plurality of changes in the source data.

7. The apparatus of claim 6, wherein the backup service produces the backup data over a plurality of backup cycles and the first plurality of changes and the second plurality of changes are produced over the plurality of backup cycles.

8. The apparatus of claim 6, wherein the means for identifying at least one deviation from the at least one trend in the second plurality of changes further comprises:
   means for comparing the second plurality of changes against the at least one rule as the second plurality of changes are produced; and
   means for defining a deviation or deviations from the at least one trend in response to the second plurality of changes violating the at least one rule.

9. The apparatus of claim 6, wherein the means for identifying at least one deviation from the at least one trend in the second plurality of changes further comprises:
   means for generating at least one notification including information indicative of the at least one deviation; and
   means for sending the at least one notification to a network management system.

10. The apparatus of claim 6, wherein each of the at least one trend is defined by a frequency of change in at least one file or at least one file type over at least one period of time.

11. A non-transitory computer readable storage medium having instructions stored thereon that when executed by a processor cause the processor to perform a method of monitoring source data that is a target of a backup service, comprising:
   receiving configuration data that identifies a type of change and a period of time over which the type of change is to occur before a trend is established, wherein the type of change comprises at least one of a deletion, creation, and modification of files;
   generating threshold data based on the type of change and the period of time;
   analyzing backup data produced by the backup service over the period of time;
   identifying a first plurality of changes in the source data;
   comparing the first plurality of changes to the threshold data;
   defining at least one trend in response to the first plurality of changes satisfying the threshold data, wherein defining the at least one trend comprises at least determining that a plurality of files are modified infrequently based on comparing the first plurality of changes to the threshold data;
   generating at least one rule that respectively describes the at least one trend, wherein the at least one rule is defined by the configuration data; and
   identifying at least one deviation from the at least one trend in a second plurality of changes in the source data.

12. The non-transitory computer readable storage medium of claim 11, wherein the backup service produces the backup data over a plurality of backup cycles and the first plurality of changes and the second plurality of changes are produced over the plurality of backup cycles.

13. The non-transitory computer readable storage medium of claim 12,
   wherein the step of identifying the at least one deviation comprises:
   comparing the second plurality of changes against the at least one rule as the second plurality of changes are produced; and
   defining a deviation or deviations from the at least one trend in response to the second plurality of changes violating the at least one rule.

14. A system, comprising:
   at least one computer system configured to manage source data;
   a backup server configured to provide a backup service the target of which is the source data, the backup service maintaining backup data that defines a backup of the source data;
   a monitoring module, including:
      a rule generation module configured to receive configuration data that identifies a type of change and a period of time over which the type of change is to occur before a trend is established, wherein the type of change comprises at least one of a deletion, creation, and modification of files, generate threshold data based on the type of change and the period of time, analyze the backup data produced by the backup service over the period of time, identify a first plurality of changes in the source data from the backup data, compare the first plurality of changes to the threshold data, define at least one trend in response to the first plurality of changes satisfying the threshold data, wherein defining the at least one trend comprises at least determining that a plurality of files are modified infrequently based on comparing the first plurality of changes to the threshold data; and generate at least one rule that respectively describes the at least one trend, wherein the at least one rule is defined by the configuration data; and
      a detection module configured to identify at least one deviation from the at least one trend in a second plurality of changes in the source data from the backup data.

15. The system of claim 14, wherein the monitoring module is implemented by the backup server.

16. The system of claim 14, further comprising:
   a network management system;
   wherein the detection module is configured to generate at least one notification including information indicative of the at least one deviation and send the at least one notification to the network management system.

* * * * *